No. 731,106. PATENTED JUNE 16, 1903.
T. T. GAFF & J. F. GENT.
APPARATUS FOR PURIFYING BRINE.
APPLICATION FILED SEPT. 26, 1902.
NO MODEL.
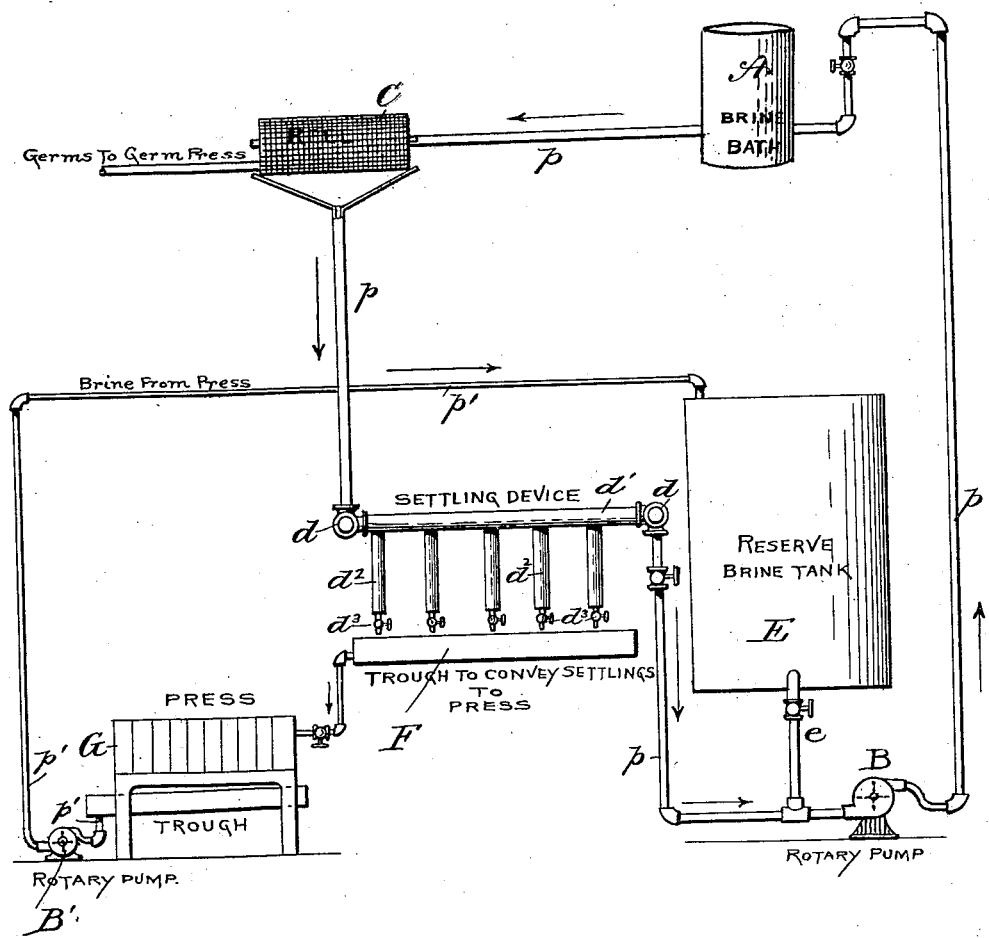

No. 731,106. Patented June 16, 1903.

UNITED STATES PATENT OFFICE.

THOMAS T. GAFF, OF BARNSTABLE, MASSACHUSETTS, AND JOSEPH F. GENT, OF MOUNT CLEMENS, MICHIGAN; SAID GENT ASSIGNOR OF ONE-SIXTH OF HIS RIGHT TO SAID GAFF.

APPARATUS FOR PURIFYING BRINE.

SPECIFICATION forming part of Letters Patent No. 731,106, dated June 16, 1903.

Application filed September 26, 1902. Serial No. 124,988. (No model.)

*To all whom it may concern:*

Be it known that we, THOMAS T. GAFF, of Barnstable, in the county of Barnstable and State of Massachusetts, and JOSEPH F. GENT, of Mount Clemens, in the county of Macomb and State of Michigan, have invented a new and useful Apparatus for Purifying Brine, of which the following is a specification.

In Letters Patent No. 687,219, dated November 26, 1901, granted to Thomas T. Gaff, one of the applicants herein, is described and claimed an improvement in the treatment of Indian corn which involves, among other things, the employment of a brine-bath through which the previously crushed or broken corn is passed for the purpose of separating the germ portions from the starchy portions. The latter being heavier sink in the bath. The germs being lighter float and are carried off with the brine at the overflow, there being a continuous current of brine into, through, and from the bath. In the practice of the said patented process we have found that the brine in the course of time becomes charged with fine starchy and glutinous material, which is not removed from the brine with the heavier and larger starchy particles, but remains therein and is minute and light enough to be carried over from the bath with the brine. The presence of this material in the brine is detrimental and renders the brine in time more or less inefficient for the work of separation.

In an application of even date herewith, Serial No. 124,982, we have described and claimed a process for remedying this objection and of purifying the brine to such an extent as to permit it to be used over and over again continuously for separating purposes, the said process consisting, essentially, in maintaining a constant circulation of the brine through, from, and back into the bath, segregating from the brine the germs carried over with it from the bath and then separating out from this germ-free brine as it travels onward back again to the bath the starchy and glutinous matter contained in it.

The invention subject of the present application is directed to an apparatus designed to be used in the practice of said process and also designed to recover the fine starchy and glutinous material thus separated from the brine.

The accompanying drawing represents an apparatus embodying our invention in its preferred form.

The drawing is to a great extent diagrammatic, inasmuch as the different parts of the apparatus, with the exception of the "settling device," are mechanisms which are known and in use, and the particular form of the settling device itself herein shown is the subject of an application for Letters Patent of even date herewith in the name of Joseph F. Gent, one of the applicants herein.

In the drawing, A is the brine-bath, which preferably is such as described and illustrated in our Letters Patent No. 687,219, dated November 26, 1901. To and from the brine-bath lead pipes $p$, through which and the bath a continuous circulation of brine is maintained by any suitable means—as, for example, a rotary power-driven pump B, interposed in the pipe-circuit. C is a reel (typical of any usual or convenient straining device) through which passes the current of brine from the bath, carrying with it the germs, which are separated in the reel from the brine, the latter flowing therefrom down into a settling device D, which can conveniently consist of tubular headers $d$, closed at their ends and connected by any suitable number of cross-pipes $d'$, provided each with a number of long pendent pockets $d^2$, each having at its lower end a discharge-opening controlled by a valve or cock $d^3$. This particular form of settling device, to which we do not limit ourselves, but which we prefer to use, is not of our joint invention, but is the invention of Joseph F. Gent, one of the applicants herein, and has been made by him the subject of an application of Letters Patent of even date herewith.

The starchy and glutinous material in the brine is caught by and settles in great part in the pockets $d^2$, while the brine, now purified sufficiently for the purposes of its reuse, flows on to the pump B and by the latter is returned to the brine-bath. The pockets $d^2$ are opened from time to time to empty them of their accumulated thick liquid contents. E is a reserve brine-tank having a valve-controlled connection $e$ with the circulation-pipe system $p$, so that it may replace from time to time the unavoidable loss of brine. In this way and by these means the brine in a continuous-circulation system can be purified during its travel from and back to the bath, the purification step taking place after it is separated from the germs and before it reaches the bath. It is preferred also to interpose the purifying device in the pipe-circuit at a point between the reel C and the pump B, so that the brine shall be purified before it reaches the pump. This, however, is not indispensable. It may be interposed at any point in the pipe-circuit after the germs have been carried off from the brine.

The thick liquid contents of the pockets $d^2$ consist, mainly, of starchy material. This starchy material we recover, and we also save the brine with which it is mingled. To this end the thick liquid contents of the pockets $d^2$ are discharged into and caught by a trough F, from which they are led, as shown, into a suitable separator, typified by press G, of known construction, wherein the solids are taken out, the brine expressed therefrom being returned by an auxiliary pump B' through piping $p'$ to any suitable receptacle—as, for example, the reserve brine-tank E.

It is to be remarked that either one of the two types of separating devices D G may be used to the exclusion of the other—that is, the press G may be introduced into the pipe-circuit $p$ instead of the settling device D; but were presses used alone it would require a great number of them to pass the current of brine along with sufficient expedition, with consequent increase of expense attendant upon installing and operating the same, an expense which is saved by the introduction of the settling device. On the other hand, were the settling device used alone the brine would be kept clear of starchy matter to a sufficient degree; but the recovery of the solids thus separated out from it would be difficult, if not practically impossible. For these reasons we prefer to use these two agencies in conjunction.

It is to be remarked here that the germs after they have been separated out from the brine can also be passed through presses. The germs as they leave the reel are saturated with brine. By passing them through continuously-operating presses this brine is expressed and the germs are brought to a condition of comparative dryness. The brine thus expressed from the germs carries with it more or less finely-divided starchy and glutinous material, which may be separated out from the brine and recovered in the same way and by the same means as the like material in the brine of the bath, and the brine itself can then be returned to the main circulation system of the bath or to any suitable receptacle.

Having described our improvement and the best way now known of carrying the same into effect, we state that we do not limit ourselves to the details herein set forth in illustration of the same, for manifestly the same can be considerably varied without departure from the spirit of our invention; but

What we claim, and desire to secure by Letters Patent, is as follows:

1. The combination with the brine-bath, a pipe-circuit leading from and back to said bath, means for maintaining a continuous circulation of brine therethrough, and means for segregating from the brine the germs carried over by the overflow from the bath, of a separator interposed in the pipe-circuit and arranged and operating substantially as described to separate out, from the germ-free brine, the residual starchy and glutinous matter contained therein—all substantially as hereinbefore set forth.

2. The combination with the brine-bath, a pipe-circuit leading from and back to said bath, and a pump for maintaining continuous circulation of brine therethrough, of a reel interposed in the pipe-circuit at or near the overflow of the bath to segregate the germs from the brine, and a settling device interposed in the pipe-circuit at a point between the reel and the pump, for separating out, from the germ-free brine, the residual starchy and glutinous matter contained therein, substantially as hereinbefore set forth.

3. The combination with the brine-bath, a pipe-circuit leading from and back into the same, means for maintaining a constant circulation of brine therethrough, and means for segregating from the brine the germs carried over therewith from the bath, of a settling device interposed in the pipe-circuit to separate out from the brine the residual starchy and glutinous matter contained therein, a press to separate out the solids from the liquid portion of said residue, and means for carrying off said residue from the settling device and delivering it to the filter-press, substantially as and for the purposes hereinbefore set forth.

In testimony whereof we have hereunto set our hands the 17th day and 22d day, respectively, of September, 1902.

THOMAS T. GAFF.
JOSEPH F. GENT.

Witnesses to signature of Thomas T. Gaff:
Z. E. GAFF,
CHARLES F. PARKER.

Witnesses to signature of Joseph F. Gent:
WINRUT H. D. FOX,
ALFRED J. PARKER.